2,710,291

CURING OF POLYISOBUTYLENE

Julian R. Little, Packanack Lake, N. J., assignor to United States Rubber Company, New York, N. Y., a corporation of New Jersey No Drawing. Application October 8, 1952, Serial No. 313,791

1 Claim. (Cl. 260—79.5)

This invention relates to the curing of polyisobutylene.

Polyisobutylene is a completely saturated hydrocarbon elastomer. It is a high molecular weight solid resembling unmilled crepe rubber in consistency at room temperatures. It is probably the most stable of the commercially available elastomers toward deterioration reactions. As a consequence of this stability, it has not heretofore been possible to vulcanize polyisobutylene by any practical method.

It has now unexpectedly been found that polyisobutylene may be cured by heating it in the presence of sulfur and tertiary-butyl peroxide. The curing of the elastomer is evidenced by an increased modulus and higher tensile strength.

The following examples illustrate the process of the invention in more detail. Parts referred to are on a weight basis.

EXAMPLE 1

This example shows the vulcanization of a polyisobutylene-carbon black stock with sulfur and tertiary-butyl peroxide.

Four separate stocks of polyisobutylene were compounded with the following ingredients in the proportions indicated. The mixing was done on a two-roll mill.

| Compounding Ingredients | Stock | | | |
|---|---|---|---|---|
| | A | B | C | D |
| Polyisobutylene | 100 | 100 | 100 | 100 |
| Carbon Black | 50 | 50 | 50 | 50 |
| Sulfur | | 5 | | 5 |
| t-Butyl Peroxide | | | 5 | 5 |

The four stocks were then heated in a press for 60 minutes at 145° C. The pertinent physical properties of the resultant products are indicated in the following table:

Table I

| Physical Properties | Stock | | | |
|---|---|---|---|---|
| | A | B | C | D |
| Scott Tensile | 530 | 665 | (Tar) | 1,480 |
| Percent Elongation | 1,350 | 1,330 | | 1,130 |
| Modulus (500% elongation) | 50 | 55 | | 100 |
| Modulus (1,000% elongation) | 130 | 160 | | 610 |

The materially higher tensile strength and modulus of stock D as compared with stock A show that stock D has been cured. The fact that stock B has substantially the same physical properties as stock A shows that the use of sulfur alone will not cause polyisobutylene to cure. Similarly, the fact that stock C is completely deteriorated indicates that t-butyl peroxide alone will not cause the elastomer to cure.

The increase in the modulus and tensile strength, illustrated by stock D, is representative of the results obtained by the process of the invention as applied to polyisobutylene stocks loaded with carbon black. In general, it has been found that treatment of carbon-black-containing polyisobutylene-stocks with sulfur and t-butyl peroxide by the process of my invention causes the tensile strength of the stocks to be raised from less than 500 to more than 1400 pounds per square inch and their modulus (500% elongation) to be increased from about 50 to 100 or more.

The behavior of the t-butyl peroxide in polyisobutylene and carbon black stocks containing sulfur has been found to be unique. A large number of similar chemicals, e. g., t-amyl peroxide, t-butyl hydroperoxide, di-t-butyl peroxyphthalate, alpha, alpha-dimethylbenzyl hydroperoxide, etc., have been substituted for the t-butyl peroxide and no evidence of cure observed.

Similarly, sulfur-containing chemicals have been substituted for the sulfur in the process of the invention. For example, a wide variety of Thiokols (alkylene polysulfide plastics), and tetramethylthiuram disulfide (a well-known rubber vulcanizing agent), have been substituted for the sulfur. These chemicals did not operate with the t-butyl peroxide to cause the polyisobutylene to cure.

Any amount of sulfur equal to at least one part per 100 parts of polyisobutylene may be used in my process to obtain a satisfactory cure. Moreover, the degree of cure, as measured by the increased modulus at 500% elongation is substantially independent of the sulfur concentration above about one part of sulfur. This is supported by the data presented in Table II. The stocks described in Table II were prepared as was stock D in Example 1, except that the amounts of sulfur and t-butyl peroxide were varied. The stocks were press-cured for two hours at 166° C.

Table II

| Parts of t-Butyl Peroxide | Modulus (500% Elongation) | | | | | |
|---|---|---|---|---|---|---|
| | Parts Sulfur | | | | | |
| | .5 | 1 | 2 | 4 | 6 | 8 |
| 2 | 115 | 175 | 190 | | | |
| 3 | | | 200 | 225 | 200 | 180 |
| 4 | | | 250 | 260 | 265 | 275 |
| 6 | | | 300 | 330 | 290 | 310 |

In the presence of at least one part of sulfur, additions of t-butyl peroxide in excess of one part per 100 parts of polyisobutylene cause curing of the polyisobutylene. The amount of cure is proportional to the amount of t-butyl peroxide added on the mill, up to about 7 parts, while larger amounts of the peroxide cause a blowing of the stock. Blowing sometimes takes place when smaller amounts of the peroxide are used. It generally can be avoided by cooling the stock before removal from the press in which it is cured. In general, from about 2 to about 7 parts of t-butyl peroxide per 100 parts of polyisobutylene are preferred.

The time of heating necessary to achieve a satisfactory cure varies somewhat with the temperature of the cure. At higher temperatures, e. g., about 175° C., a good cure is obtained in about one hour, whereas at lower temperatures, e. g., 145° C. it takes about six hours to obtain a cure comparable to that obtained in one hour at 175° C. A curing time of from one to two and one-half hours at a temperature between 150° C. and 160° C. is preferred.

The curing action effected by the sulfur and the t-butyl peroxide in the process of my invention takes place in polyisobutylene gum stocks and in polyisobutylene stocks containing non-black fillers, e. g., zinc oxide, as well as in polyisobutylene stocks containing carbon black. The cure in the gum stocks and non-black-reinforced stocks is evidenced by the insolubility of these stocks in cyclohexane after treatment by the process of my invention.

Having thus described my invention, what I claim and desire to protect by Letters Patent is:

A method of curing elastomeric polyisobutylene which comprises incorporating in the elastomer at least about one percent by weight of sulfur, and from about 2 to 7 percent by weight of tertiary-butyl peroxide, based on the weight of the uncured polyisobutylene, and heating the mixture at a temperature of at least about 145° C. and for a time sufficient to cure the polyisobutylene.

UNITED STATES PATENTS

References Cited in the file of this patent 2,582,510    Stiratelli _____ Jan. 15, 1952